(12) United States Patent
Yoshimura

(10) Patent No.: US 7,628,722 B2
(45) Date of Patent: Dec. 8, 2009

(54) VEHICULAR POWER TRANSMISSION DEVICE

(75) Inventor: Takahiro Yoshimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 245 days.

(21) Appl. No.: 11/866,037

(22) Filed: Oct. 2, 2007

(65) Prior Publication Data

US 2008/0261746 A1 Oct. 23, 2008

(30) Foreign Application Priority Data

Oct. 2, 2006 (JP) .............................. 2006-270323

(51) Int. Cl.
*F16H 48/20* (2006.01)
(52) U.S. Cl. ..................................... 475/249
(58) Field of Classification Search ................. 475/248, 475/249, 253
See application file for complete search history.

(56) References Cited

U.S. PATENT DOCUMENTS

| 3,656,573 | A | * | 4/1972 | Halberg | 180/249 |
| 4,074,591 | A | * | 2/1978 | Dick | 475/249 |
| 4,774,854 | A | * | 10/1988 | Ida | 475/225 |
| 2005/0090359 | A1 | * | 4/2005 | Kai et al. | 475/248 |
| 2005/0266954 | A1 | * | 12/2005 | Yoshimura | 475/249 |

FOREIGN PATENT DOCUMENTS

| JP | 01-067360 | 4/1989 |
| JP | 02035240 | 2/1990 |
| JP | 06-016761 | 3/1994 |
| JP | 2003-056672 | 2/2003 |
| JP | 2005-337442 | 12/2005 |

* cited by examiner

*Primary Examiner*—Dirk Wright
(74) *Attorney, Agent, or Firm*—Oblon, Spivak, McClelland, Maier & Neustadt, L.L.P.

(57) ABSTRACT

The thrust force of a sun gear is supported by a first thrust bearing that supports a first output shaft in the direction of an axis thereof. The thrust force of a ring gear is supported by a second thrust bearing that supports a second output shaft in the direction of the axis.

4 Claims, 4 Drawing Sheets

VEHICULAR POWER TRANSMISSION DEVICE

INCORPORATION BY REFERENCE

The disclosure of Japanese Patent Application No. 2006-270323 filed on Oct. 2, 2006, including the specification, drawings and abstract is incorporated herein by reference in its entirety.

BACKGROUND OF THE INVENTION

1. Field of Invention

The invention relates to a structure of a vehicular power transmission device. In particular, the invention relates to a support structure for a differential device provided in a vehicular power transmission device.

2. Description of Related Art

A differential limiting device using a planetary gear is known as a differential limiting device that is used in a center differential of a vehicle or the like to generate differential limiting force during the drive force distribution and the differential operation between the front and rear wheels. FIG. 4 is a sectional view of a differential limiting device 100 using a planetary gear according to a technology related to the invention. The meshing teeth of the pinion gears P, the ring gear R and the sun gear S of the planetary gear are helical teeth. The ring gear R and the sun gear S are coaxially disposed on an axis D so as to be rotatable relative to each other. The helical teeth of the pinion gears P are meshed with the helical teeth of the ring gear R and the sun gear S, and the carrier CA is disposed on the axis D coaxially with the sun gear S so as to be rotatable relative to the sun gear S and the ring gear R, and supports the pinion gears P freely rotatably. It is to be noted herein that the meshing of the helical teeth of the pinion gears P with the helical teeth of the ring gear R and of the sun gear S allows thrust force to be generated. When the pinion gears P rotate (rotate about their own axes) in a direction, the thrust forces generated on the sun gear S and the ring gear R press the ring gear R or the sun gear S against the carrier CA; thus, the differential motion is limited so as to lessen the rotation difference of the carrier CA with the sun gear S and the ring gear R.

In the differential limiting device 100 constructed as described above, it is necessary to provide a structure that supports the thrust forces that are generated on the sun gear S and the ring gear R, in other words, the structure that receives the thrust forces that are generated on the sun gear S and the ring gear R. Therefore, a housing 102 is provided so as to cover the ring gear R, and the thrust forces are supported by the housing 102 via a thrust washer 104 disposed between the ring gear R and the housing 102, and a thrust washer 106 disposed between the carrier CA and the housing 102. Hence, in the differential limiting device 100, since it is necessary to dispose the housing 102 for supporting the thrust force, there is a problem of the differential limiting device 100 increasing in size by an amount that corresponds to a thickness (Aa) of an outer wall of the housing 102.

Against this problem, Japanese Patent Application Publication No. 2005-337442 (JP-A-2005-337442) discloses a technology regarding a differential limiting device in which the carrier and the sun gear are sandwiched by a first side wall portion and a second side wall portion that extend radially inward from two end portions of the ring gear. Therefore, the technology is able to thoroughly perform a differential limiting function without the provision of a housing that covers the ring gear from outside.

In conjunction with a vehicular power transmission device equipped with a differential limiting device disclosed in Japanese Patent Application Publication No. 2005-337442 (JP-A-2005-337442), no teaching or mention is disclosed regarding the arrangement of bearings that support, in axial and radial directions, an input shaft connected to the differential limiting device and various other elements that constitute the differential limiting device. However, from viewpoints of reduction of vibration, further size reduction of the device, and supply of stabilized differential limiting torque, there is a need to set an appropriate arrangement of bearings and the like.

SUMMARY OF THE INVENTION

It is an object of the invention to provide a vehicular power transmission device equipped with a planetary gear type differential device which is capable of suitably supporting the differential device and therefore achieving reduction of vibration, further size reduction of the device, and stabilization of the differential limiting torque.

A first aspect of the invention relates to a vehicular power transmission device. This vehicular power transmission device includes a casing, a differential device using a planetary gear housed in the casing, an input shaft for transmitting power to the differential device, and a first output shaft and a second output shaft to which the power from the input shaft is output via the differential device. The differential device includes a carrier, a sun gear, and a ring gear. The carrier is coupled to the input shaft, and the sun gear is coupled to the first output shaft, and the ring gear is coupled to the second output shaft. The first output shaft and the second output shaft are disposed coaxially in series on an axis, and an end of the first output shaft is supported in a direction of the axis by the casing via a first thrust bearing, and the second output shaft is supported in the direction of the axis by the casing via a second thrust bearing. Thrust force of the sun gear is supported by the first thrust bearing via the first output shaft, and thrust force of the ring gear is supported by the second thrust bearing.

According to the vehicular power transmission device in accordance with the first aspect of the invention, the sun gear and the ring gear of the differential device are coupled to the first output shaft and the second output shaft, respectively. An end of the first output shaft is supported in the direction of the axis by the casing via the first thrust bearing, and the second output shaft is supported in the direction of the axis by the casing via the second thrust bearing. Therefore, the thrust force of the sun gear can be supported by the first thrust bearing that supports the first output shaft in the direction of the axis, and the thrust force of the ring gear can be supported by the second thrust bearing that supports the second output shaft in the direction of the axis. This makes it possible to omit the thrust bearings that are needed in order to support the sun gear and the ring gear in the related-art vehicular power transmission devices. Therefore, the vehicular power transmission device can be reduced in size. Besides, since the thrust force generated in the differential device is supported via the first output shaft and the second output shaft, the first and second thrust bearings are always rotated by rotation of the first and second output shafts while the vehicle is being driven. This eliminates the need for relatively large rotation-starting torque that is generated in a related art at the time of starting the rotation of the first and second thrust bearings, and thus allows stable operation of the differential device. Furthermore, this construction also achieves an effect of stabilizing the differential torque despite changes in the differential speed, and therefore achieves an effect of restraining the vibration caused by fluctuation of the differential torque when the vehicle starts in a turning state.

In the vehicular power transmission device, (a) the first output shaft may be provided with outer peripheral teeth that are helical teeth, and meshing teeth of each of rotating elements of the differential device that include the carrier, the sun gear and the ring gear may be provided with helical teeth, and (b) the outer peripheral teeth provided on the first output shaft and the helical teeth of the sun gear may be provided in such directions that the thrust force generated by meshing of the outer peripheral teeth of the first output shaft and the thrust force generated by meshing of the helical teeth of the sun gear become opposite in direction to each other, and (c) a pressing surface that is pressed by the thrust force of the first output shaft and by the thrust force of the sun gear may be formed between the first output shaft and the sun gear.

According to this vehicular power transmission device, the first output shaft is provided with the outer peripheral teeth that are helical teeth, and the meshing teeth of each of the rotating elements of the differential device are helical teeth. The outer peripheral teeth provided on the first output shaft and the helical teeth of the sun gear are provided in such directions that the thrust force generated by the meshing of the outer peripheral teeth of the first output shaft and the thrust force generated by the meshing of the helical teeth of the sun gear become opposite in direction to each other, and the pressing surface that is pressed by the thrust force of the first output shaft and by the thrust force of the sun gear is formed between the first output shaft and the sun gear. Therefore, the first output shaft and the sun gear press each other at the pressing surface due to their thrust forces. If the thrust force of the sun gear is larger than the thrust force of the first output shaft, thrust force acts on the casing via the first thrust bearing. If the thrust force of the first output shaft is the larger, thrust force acts on the casing via the second thrust bearing. In the related-art vehicular power transmission device, the casing can deform due to thrust force, and can cause an error in the mesh transmission of the outer peripheral teeth provided on the first output shaft. On the other hand, in the vehicular power transmission device of this aspect of the invention, if the helix angle and the pitch diameter of the helical teeth provided on the first output shaft and the helix angle and the pitch diameter of the helical teeth of the sun gear are suitably set, the thrust forces of the first output shaft and the sun gear can be made substantially equal. Thus, as the thrust forces of the first output shaft and the sun gear offset each other, the thrust force that acts on the casing can be made substantially zero and the compelling force that occurs on the outer peripheral teeth can be reduced. Therefore, the gear noise vibration caused due to the thrust force working as a compelling force can be reduced.

In the vehicular power transmission device, each of the first output shaft and the second output shaft may be supported in radial directions by the casing via a cylindrical roller bearing so as to be movable in the direction of the axis.

According to this vehicular power transmission device, since the first output shaft and the second output shaft are supported in radial directions by the casing via their respective cylindrical roller bearings so as to be movable in the direction of the axis, the thrust forces of the first and second output shafts can be reliably supported by the first and second thrust bearings, and movements of the first and second output shafts in the direction of the axis can be thereby restricted.

In the vehicular power transmission device, (a) the differential device may include a differential limiting device using a planetary gear, and (b) meshing teeth of each of the sun gear, the ring gear and a pinion gear that are in mesh may have a helix angle that causes thrust force to be generated, and the pinion gear may be rotatably supported by a pinion support hole that is formed in the carrier, and (c) pressing portions that press each other due to the thrust forces that occur when the vehicular power transmission device is driven may be provided between the carrier and the sun gear and between the carrier and the ring gear.

According to the vehicular power transmission device, the meshing teeth of each of the sun gear, the ring gear and the pinion gears of the differential device that are in mesh have a helix angle that cases thrust force to be generated. When the power transmission device is driven, thrust forces are generated on the sun gear and the ring gear due to their helix angles. Since the thrust forces press the sun gear and the ring gear against the carrier, the differential motion can be limited so that the rotation difference between the sun gear, the ring gear and the carrier becomes small.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described in detail with reference to the drawings.

Figure 1:
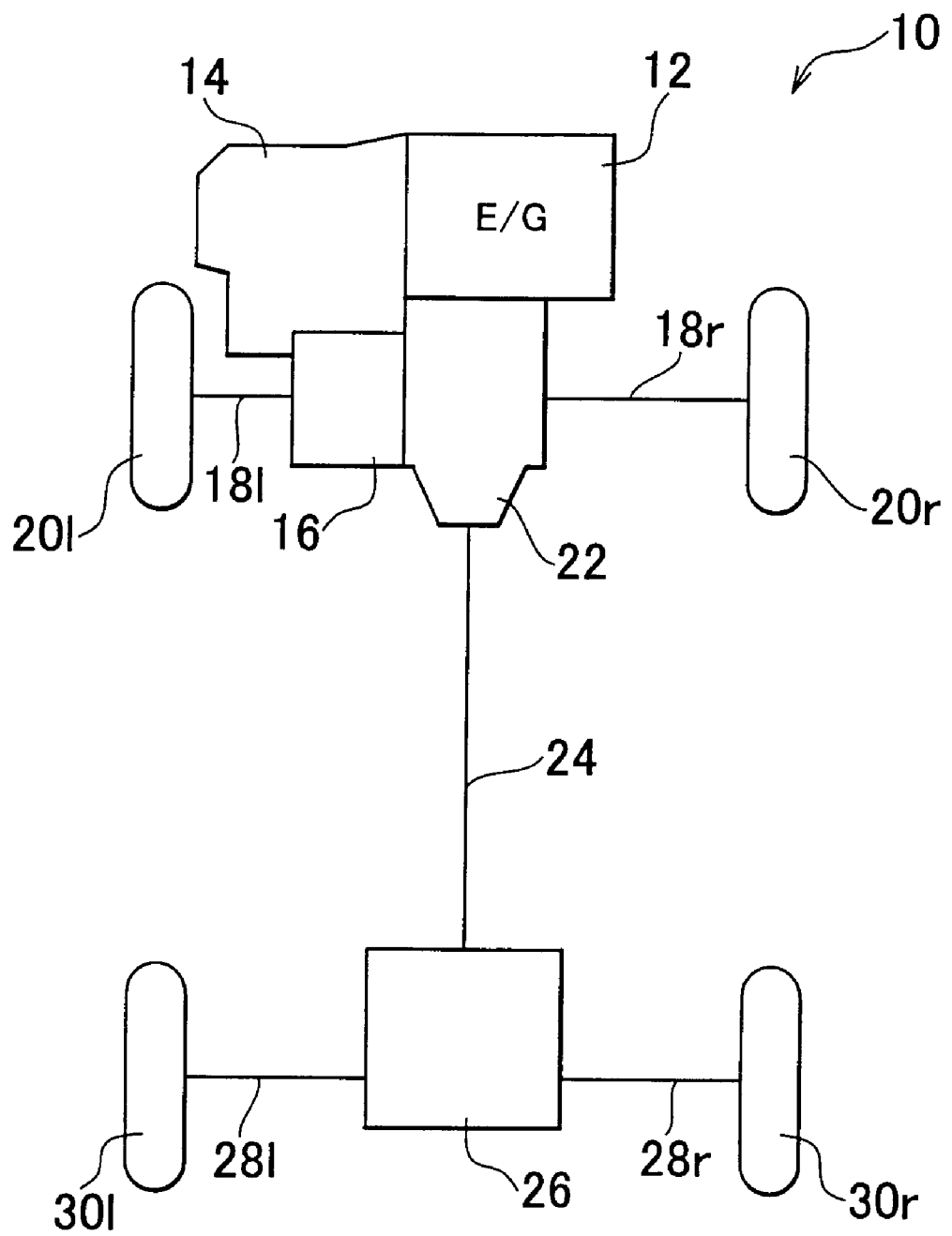
FIG. 1 is a skeleton diagram illustrating a construction of a front-rear-wheel drive vehicle based on a front-mounted engine front wheel drive method which has a vehicular power transmission device to which the invention is applied.

FIG. 1 is a skeleton diagram illustrating a construction of a front-rear-wheel drive vehicle based on a front-mounted engine front wheel drive (FF) method which has a vehicular power transmission device 10 to which the invention is suitably applied. In FIG. 1, a drive force (torque) generated by an engine 12 that is a drive force source is transmitted to a transfer 22 via an automatic transmission 14. The drive force transmitted to the transfer 22 is distributed to a front-wheel differential gear device (front differential) 16 and to a propeller shaft 24 that is a drive force transmission shaft. The drive force transmitted to the front-wheel differential gear device 16 is transmitted to a pair of left and right front wheels 20*l*, 20*r* via a pair of left and right front wheel axle shafts 18*l*, 18*r*. On the other hand, the drive force transmitted to the propeller shaft 24 is transmitted to a pair of left and right rear wheels 30*l*, 30*r* via a rear-wheel differential gear device 26 and a pair of left and right rear wheel axle shafts 28*l*, 28*r*.

The engine 12 is an internal combustion engine, for example, a gasoline engine that generates drive force by the combustion of fuel injected into the cylinders, a diesel engine, etc. Besides, the automatic transmission 14 is a speed-stepped automatic transmission that reduces or increases the speed of rotation input from the engine 12 at a predetermined speed change ratio γ before outputting the rotation. In the automatic transmission 14, any suitable one of forward travel speed change steps, a reverse travel speed change step and a neutral state is selectively established to perform the speed change in accordance with the speed change ratio γ of the selected speed change step. In addition, the input shaft of the automatic transmission 14 is coupled to an output shaft of the engine 12 via a torque converter or the like (not shown).

Figure 2:
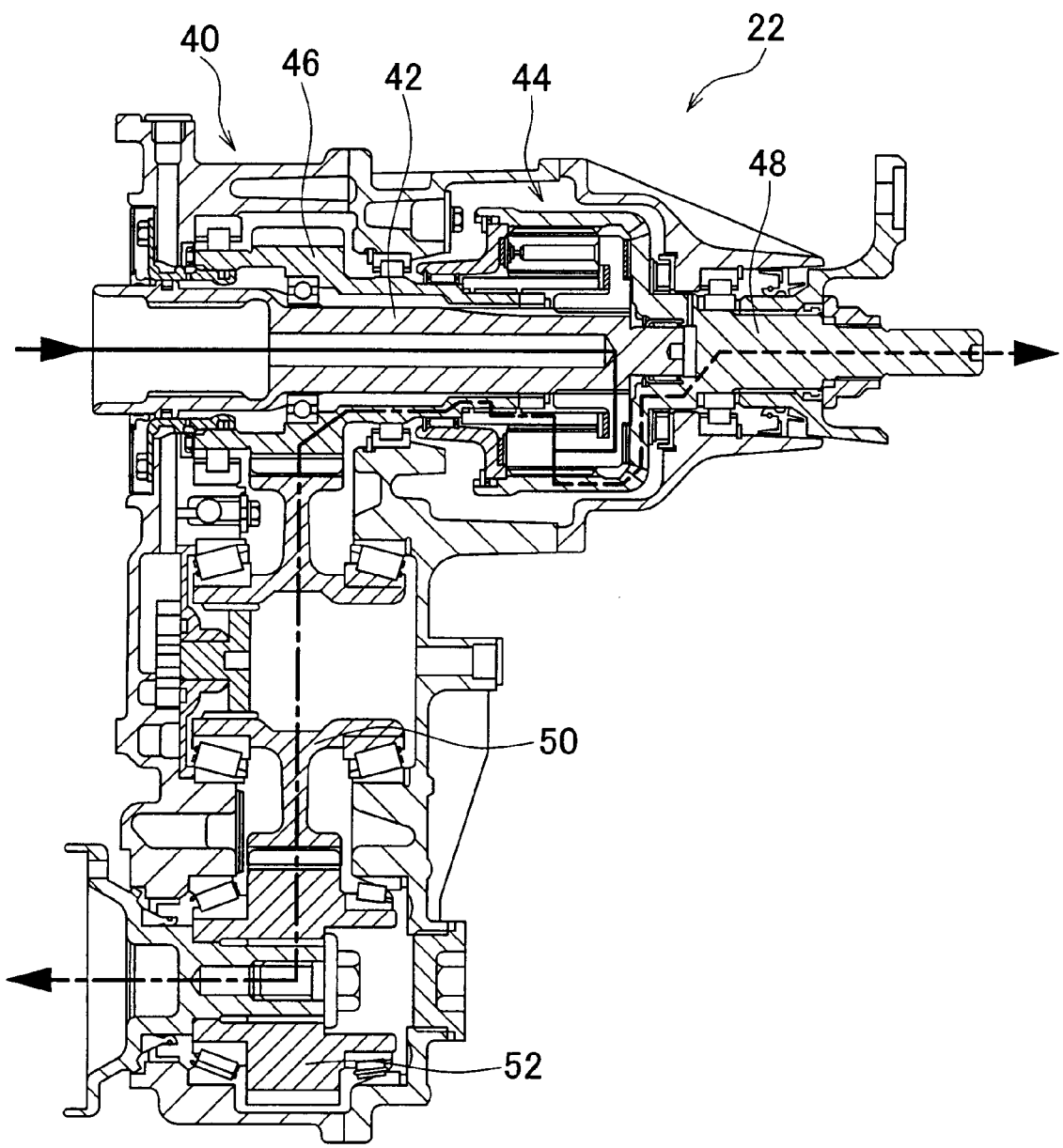
FIG. 2 is a sectional view for illustrating a structure of a transfer of the vehicular power transmission device shown in FIG. 1.

FIG. 2 is a sectional view for illustrating a structure of the transfer 22 of the vehicular power transmission device shown in FIG. 1. The transfer 22 has in a casing 40 an input shaft 42 to which the drive force from the automatic transmission 14 is input, a central differential gear device 44 that has a differential limiting function, a first output shaft 46 that outputs drive force to the front-wheel differential gear device (front differential) 16, and a second output shaft 48 that outputs drive force to the propeller shaft 24. The drive force of the input shaft 42 is distributed by a central differential gear device 44 to the first output shaft 46 and the second output shaft 48, and is thereby output. The drive force output to the first output shaft 46 is transmitted to the front-wheel differential gear device 16 (the front differential) via a counter gear 50 and an output gear 52 as shown by a one-dot chain line. Besides, the drive force output to the second output shaft 48 is transmitted to the propeller shaft 24 as shown by a dashed line. Incidentally, the central differential gear device 44 in this embodiment can be regarded as a differential device in the invention, and the first output shaft 46 can be regarded as a first output shaft in the invention, and the second output shaft 48 can be regarded as a second output shaft in the invention.

Figure 3:
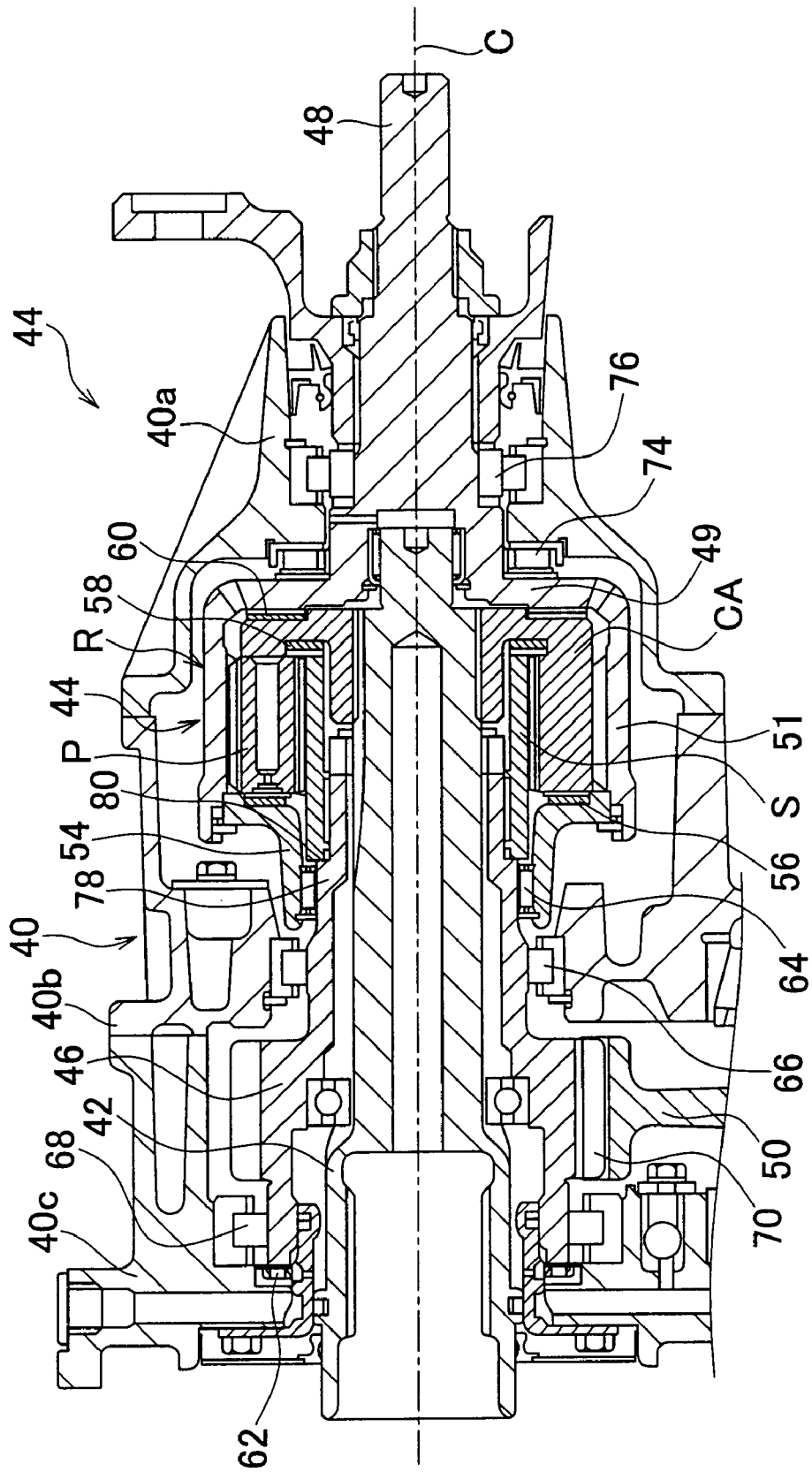
FIG. 3 is an enlarged sectional view for detailed illustration of a support structure for a central differential gear device disposed in the transfer shown in FIG. 2.
Figure 4:
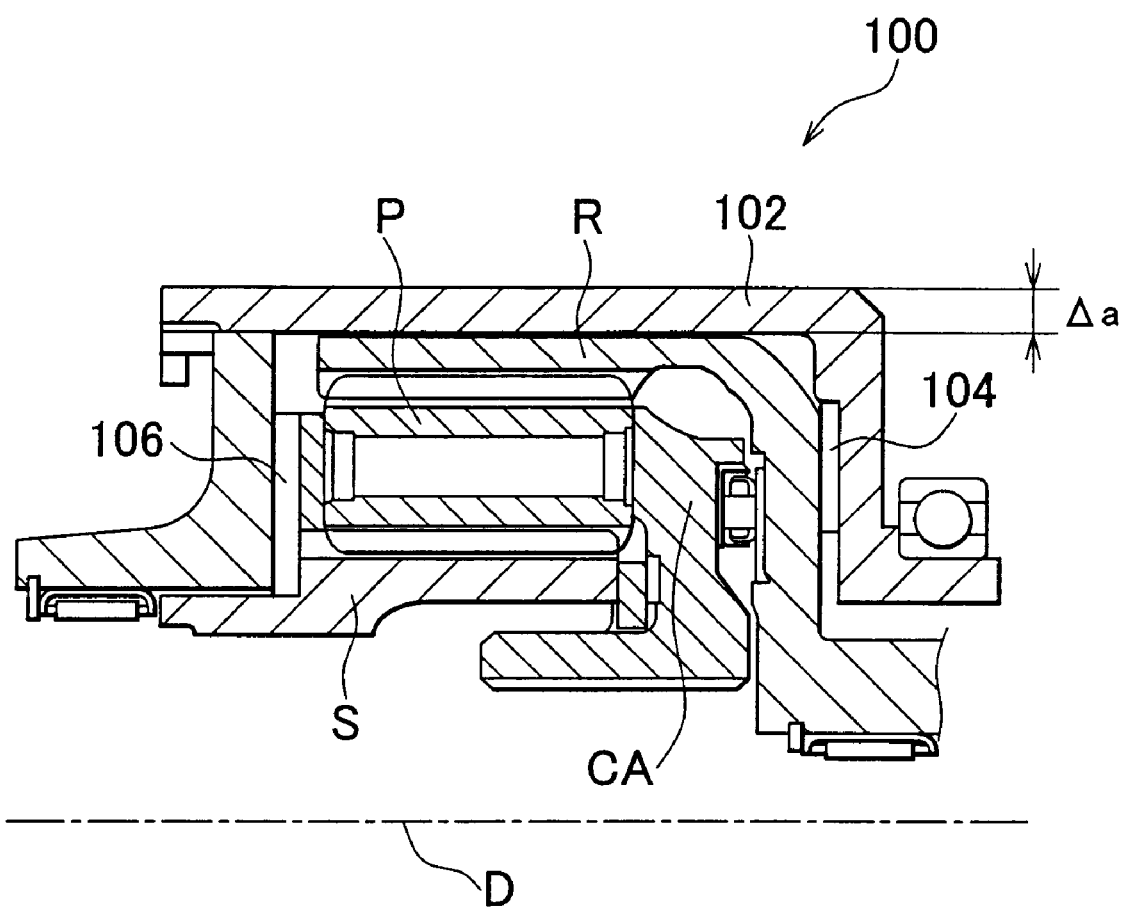
FIG. 4 is a sectional view of a related-art planetary gear type differential limiting device.

FIG. 3 is an enlarged sectional view for illustrating in detail a support structure for the central differential gear device 44 disposed within the transfer 22 shown in FIG. 2. The casing 40 is constructed of three casings, that is, a first casing 40a, a second casing 40b and a third casing 40c in that order from the side of the second output shaft 48. The first, second and third casings are integrally connected by bolts (not shown). In the casing 40, the input shaft 42 to which drive force is input from the automatic transmission 14, and the second output shaft 48 that outputs drive force to the propeller shaft 24 are disposed coaxially in series on an axis C. The central differential gear device 44 equipped with the differential limiting function is disposed on an outer periphery of a portion of the input shaft 42 that is on a second output shaft 48 side. The central differential gear device 44 is a device for distributing drive force to the front wheels and to the rear wheels. Specifically, the central differential gear device 44 appropriately distributes the drive force from the input shaft 42 to the first output shaft 46 and to the second output shaft 48 in accordance with the state of the vehicle.

Next, the central differential gear device 44 will be described. The central differential gear device 44 is a planetary gear type differential gear device, and includes a carrier CA, pinion gears P supported by the carrier CA, and a sun gear S and a ring gear R that mesh with the pinion gears P.

The carrier CA is coupled to the input shaft 42 by spline-fitting so as to be unrotatable relative to the input shaft 42, so that the carrier CA and the input shaft 42 are integrally rotated. The carrier CA has a plurality of pinion-supporting holes for supporting the pinion gears P. The pinion gears P are respectively supported in the pinion-supporting holes so as to be rotatable.

The ring gear R is disposed radially outwardly of the pinion gears P, and the sun gear S is disposed radially inwardly of the pinion gears P. The ring gear R, the sun gear S and the pinion gears P are meshed so as to be rotatable, and the meshing teeth of each of the gears are helical teeth that have a helix angle.

The ring gear R has a shape of a bottomed cylinder having an open end, and has a side wall 49 that extends radially from an end portion of the second output shaft 48, and a cylinder portion 51 that extends in a direction of the axis from an outer peripheral edge of the side wall 49. The open-end side of the ring gear R is provided with a side wall member 54 that is spline-fitted to an inner peripheral surface of the ring gear R so as to be unrotatable relative to the ring gear R, and that is fixed immovably in the directions of the axis by a snap ring that is fitted to the ring gear R. In this manner, two ends of the carrier CA are sandwiched by the side wall 49 and the side wall member 54 of the ring gear R. A thrust washer 56 is disposed between the side wall member 54 and the carrier CA. Likewise, thrust washers 58, 60 are disposed between the sun gear S and the carrier CA, and between the carrier CA and the side wall 49 of the ring gear R. Furthermore, the sun gear S is rotated integrally with the first output shaft 46 because an end of the internal peripheral surface of the sun gear S is unrotatably coupled by spline-fitting to an end portion of the first output shaft 46. On the other hand, the ring gear R is coupled to the second output shaft 48 by integral forming, so that the ring gear R and the second output shaft 48 are rotated integrally.

The rotation of the input shaft 42 is transmitted to the carrier CA spline-fitted to the input shaft 42. Then, the rotation of the carrier CA is transmitted to the pinion gears P. Since the pinion gears P are rotatably supported by the carrier CA, rotation of the carrier CA causes the pinion gears P to revolve about the axis C. This revolution force is transmitted to the ring gear R and the sun gear S. Thus, the rotation of the carrier CA is transmitted to the propeller shaft 24 via the ring gear R and the second output shaft 48, and is also transmitted to the front-wheel differential gear device 16 via the sun gear S and the first output shaft 46.

The distribution of the drive forces (torques) transmitted to the sun gear S and the ring gear R during revolution of the pinion gears P is expressed by the following expression. In the expression, Tf represents a front wheel-side drive torque transmitted to the sun gear S, and Tr represents a rear wheel-side drive torque transmitted to the ring gear R. Furthermore, Tc represents the drive torque of the input shaft 42 input to the carrier CA, and r1 represents the distance from the axis C that is also the center of revolution of the pinion gears P to the helical teeth of the sun gear S, and r2 represents the distance from the axis C to the helical teeth of the ring gear R.

$$Tf = r1/(r1+r2) \times Tc(\%) \quad (1)$$

$$Tr = r2/(r1+r2) \times Tc(\%) \quad (2)$$

As can be understood from the expressions (1) and (2), the drive torque transmitted to the sun gear S and the drive torque transmitted to the ring gear R are different from each other, that is, the drive torque transmitted to the ring gear R is larger, that is, the drive torque transmitted to the propeller shaft 24 (to the rear wheels) is larger.

Next, the case where the rotations of the sun gear S and the ring gear R become different from each other will be described. When the rotations of the sun gear S and the ring gear R become different from each other, the rotation difference therebetween causes the pinion gears P in mesh with the sun gear S and the ring gear R to rotate about their own axes in a direction that corresponds to the rotation difference. Since the meshing teeth of the pinion gears P, the sun gear S and the ring gear R are helical teeth having a helix angle, thrust force occurs on the sun gear S and the ring gear R. For example, when the pinion gears P are rotated on their own axes in one direction due to the rotation difference and a thrust force occurs on the sun gear S in such a direction as to press the thrust washer 58, the sun gear S is pressed against the carrier CA by the thrust force via the thrust washer 58. Besides, a thrust force occurs on the ring gear R in the direction opposite to the direction of the thrust force on the sun gear S, so that the ring gear R is pressed against the carrier CA via the thrust washer 60. Thus, as the sun gear S and the ring gear R are pressed against the carrier CA, the differential motion is limited so that the rotation difference between the carrier CA, the sun gear S and the ring gear R is limited. On the other hand, when due to the rotation difference, the pinion gears P are rotated about their own axes in the direction opposite to the aforementioned direction, thrust force occurs on the ring gear R in the direction opposite to the aforementioned direction, and the side wall member 54 integrally connected to the ring gear R is pressed against the carrier CA via the thrust washer 56. Thus, as the ring gear R is pressed against the carrier CA via the side wall member 54, the differential motion is limited so that the rotation difference between the ring gear R and the carrier CA becomes small. In addition, the thrust washers (56, 58, 60) in this embodiment can each be regarded as a pressing portion in the invention.

Next, support structures for the central differential gear device 44, the first output shaft 46 and the second output shaft 48, which are portions of the invention, will be described. The first output shaft 46 is disposed on the outer peripheral side of the input shaft 42, and a central differential gear device 44-side end of the first output shaft 46 is unrotatably coupled by spline-fitting to an inner peripheral portion of the sun gear S. A first thrust bearing 62 is disposed between another end of the first output shaft 46 and the third casing 40c. The first output shaft 46 is supported in the direction of the axis of the casing 40c via the first thrust bearing 62. Besides, the first output shaft 46 is supported in radial directions by a shell needle bearing 64 disposed between the first output shaft 46 and the inner peripheral portion of the side wall member 54, a first cylindrical roller bearing 66 movable in the direction of the axis which is disposed so as to be juxtaposed with the shell needle bearing 64 and is interposed between the second casing 40b and the first output shaft 46, and a second cylindrical roller bearing 68 movable in the direction of the axis which is disposed between the third casing 40c and the outer peripheral surface of an other end-side portion of the first output shaft 46. That is, the first output shaft 46 is supported by the second casing 40b so as to be movable in the direction of the axis via the first cylindrical roller bearing 66, and is also supported by the third casing 40c so as to be movable in the direction of the axis via the second cylindrical roller bearing 68. In addition, the first thrust bearing 62 in this embodiment can be regarded as a first thrust bearing in the invention, and the first cylindrical roller bearing 66 and the second cylindrical roller bearing 68 can be regarded as cylindrical roller bearings in the invention.

The first output shaft 46 is provided with outer peripheral teeth 70 that mesh with the counter gear 50. The outer peripheral teeth 70 are formed as helical teeth having a helix angle, and are constructed so as to generate a thrust force parallel to the axis C due to the helix angle when the outer peripheral teeth 70 mesh with the counter gear 50.

A second thrust bearing 74 is interposed between the side wall 49 of the ring gear R and the first casing 40a. The ring gear R and the second output shaft 48 connected to the ring gear R are supported in the direction of the axis by the first casing 40a via the second thrust bearing 74. Thereby, the thrust force generated on the ring gear R is supported by the second thrust bearing 74. A third cylindrical roller bearing 76 is interposed between the first casing 40a and the second output shaft 48. The ring gear R and the second output shaft 48 are supported in radial directions by the third cylindrical roller bearing 76, which is movable in the direction of the axis. That is, the second output shaft 48 is supported by the first casing 40a so as to be movable in the direction of the axis via the third cylindrical roller bearing 76. Incidentally, the second thrust bearing 74 in this embodiment can be regarded as a second thrust bearing in the invention, and the third cylindrical roller bearing 76 can be regarded as a cylindrical roller bearing in the invention.

The first output shaft 46 has, near the shell needle bearing 64, a stepped portion 78 that is protruded in the radial directions. A pressing surface 80 where the first output shaft 46 and the sun gear S presses each other due to the thrust forces occurring on the first output shaft 46 and the sun gear S is formed between a side surface of the stepped portion 78 formed in the first output shaft 46 and a side surface of the sun gear S. Therefore, the thrust force generated in the direction to the side of the first thrust bearing 62 by the meshing of the sun gear S is supported by the pressing surface 80 and by the first thrust bearing 62 via the first output shaft 46.

The orientation of the helix angle of the outer peripheral teeth 70 formed on the first output shaft 46 is set so that the thrust force generated on the first output shaft 46 by the meshing between the outer peripheral teeth 70 and the counter gear 50 when a drive torque for a forward travel-direction acceleration is output from the central differential gear device 44 to the first output shaft 46 via the sun gear S is generated in the direction to the side of the sun gear S. The orientation of the helix angle of the sun gear S is set so that when a drive torque that provides a forward travel-direction acceleration is output from the pinion gears P to the sun gear S, the thrust force generated on the sun gear S by the meshing between the pinion gears P and the sun gear S is generated in the direction to the side of the first output shaft 46. That is, the outer peripheral teeth 70 of the first output shaft 46 and the helical teeth of the sun gear S are provided in such directions that the thrust forces generated on the first output shaft 46 and the sun gear S by their own meshings at the time of acceleration of the vehicle in the forward travel direction become opposite in direction to each other.

Due to the foregoing construction, when drive force that provides acceleration in the forward travel direction is applied to the first output shaft 46 and the sun gear S, the thrust force Fc generated on the first output shaft 46 and the thrust force Fs generated on the sun gear S are expressed by the following expressions. In the expressions, Tf represents the front wheel-side drive torque applied to the first output shaft 46 and the sun gear S, and $\phi Dcp$ represents the pitch circle diameter of the outer peripheral teeth 70 of the first output shaft 46, and $\beta c$ represents the helix angle of the outer peripheral teeth 70. Furthermore, $\phi Dsp$ represents the pitch circle diameter of the sun gear S, and $\beta s$ represents the helix angle of the sun gear S.

$$Fc = Tf/(\phi Dcp/2) \times \tan \beta c \qquad (3)$$

$$Fs = Tf/(\phi Dsp/2) \times \tan \beta s \qquad (4)$$

At the time of acceleration of the vehicle in the forward travel direction, the thrust force Fc generated on the first output shaft 46 and the thrust force Fs generated on the sun gear S act in the directions opposite to each other, and therefore the first output shaft 46 and the sun gear S press the pressing surfaces 80 of each other. When the thrust force difference F1 (=Fc−Fs) is positive in value, that is, when the thrust force Fc of the first output shaft 46 is larger than the thrust force of the sun gear S, the difference F1 acts on the first casing 40a via the carrier CA, the ring gear R and the second thrust bearing 74. On the other hand, when the thrust force difference F1 is negative in value, that is, when the thrust force Fs of the sun gear S is larger than the thrust force Fc of the first output shaft 46, the thrust force difference F1 acts on the third casing 40c via the first thrust bearing 62. Thus, due to the provision of the pressing surfaces 80 where the first output shaft 46 and the sun gear S press each other, their thrust forces offset each other, and therefore the thrust force that actually acts on the casing 40 can be reduced. Besides, by suitably setting the pitch circle diameter and the helix angle of the first output shaft 46 and the sun gear S, the thrust force Fc and the thrust force Fs can be made substantially equal. In that case, the thrust forces Fc, Fs will offset each other, so that the thrust force that actually acts on the first casing 40a and the third casing 40c will be substantially zero. Therefore, the noise radiation from the casing 40 and the vibration thereof due to the aforementioned thrust force working as a compelling force can be reduced. Furthermore, if the thrust force that acts on the third casing 40c is set small, the load imposed on the first thrust bearing 62 becomes small, so that the first thrust bearing 62 can be reduced in size. If the casing 40 is deformed by the thrust force, there can occur an error in the mesh transmission by the outer peripheral teeth 70 provided on the first output shaft 46. However, since the thrust force that acts on the casing 40 can be brought to substantially zero and the compelling force that occurs on the outer peripheral teeth 70 can be reduced as mentioned above, the gear noise vibration due to the thrust force working as a compelling force can be reduced.

The central differential gear device 44 is structured so that the thrust forces of the sun gear S and the ring gear R are supported by the casing 40 via the first thrust bearing 62 and the second thrust bearing 74. This structure does not require the bearings that are needed in the related-art vehicular power transmission device in order to rotatably support the rotating elements (the sun gear S, the carrier CA, and the ring gear R) of the central differential gear device 44. Furthermore, the thrust forces of the sun gear S and the ring gear R of the central differential gear device 44 are supported by the casing 40. Since during the running of the vehicle, the first output shaft 46 and the second output shaft 48 are rotated even when the central differential gear device 44 is in a state of non-differential motion, the first thrust bearing 62 and the second thrust bearing 74 are always in a rotating state. Since the first and second thrust bearings 62, 74 are always rotating, the beginning of differential motion of the central differential gear device 44 does not require relatively large rotation-starting torque for starting the rotation of these bearings 62, 74, so that the differential limiting torque immediately following the start of differential motion can be stabilized. Due to the stabilization of the differential limiting torque, the understeer that occurs during an early period of the cornering or turning of the vehicle can be restrained. Another effect of the foregoing construction is that the differential torque becomes stable despite changes in the differential speed, and therefore the vibration caused by fluctuations of the differential torque when the vehicle starts in a turning state can be restrained.

Furthermore, since the first output shaft 46 and the sun gear S are structured so as to press each other during acceleration of the vehicle in the forward travel direction, these members can be considered as one single structural body when they press each other. It is to be noted herein that if the pitch circle diameter and the helix angle of each of the first output shaft 46 and the sun gear S are set so that the thrust force difference F1 (=Fc−Fs) becomes negative in value, that is, if the thrust force Fs of the sun gear S becomes larger than the thrust force Fc of the first output shaft 46, it becomes possible to provide a design in which the moment load needed in the calculation of the service life of the first cylindrical roller bearing 66 is borne in a divided manner by the meshing portion of the first thrust bearing 62 and the meshing portion of the sun gear S. Therefore, the moment load imposed on the first cylindrical roller bearing 66 becomes smaller. Furthermore, since the shell needle bearing 64 is provided so as to be juxtaposed with the first cylindrical roller bearing 66, the moment load is divided to the shell needle bearing 64 and the first cylindrical roller bearing 66. Therefore, it becomes possible to provide a structure in which considerably reduced moment load acts on the first cylindrical roller bearing 66, and therefore to reduce the size of the first cylindrical roller bearing 66.

Furthermore, when drive torque in the deceleration direction is loaded, for example, during engine braking, the sun gear S and the ring gear R receive thrust forces that are opposite in direction to the aforementioned thrust forces, that is, the sun gear S receives a thrust force in such a direction as to press the thrust washer 58, and the ring gear R receives a thrust force in such a direction as to press the thrust washer 60. In such a case, the sun gear S and the ring gear R press each other via the carrier CA, and the thrust forces of these gears offset each other. Therefore, the thrust force that acts on the second thrust bearing 74 becomes smaller, while a thrust force generated by the outer peripheral teeth 70 of the first output shaft 46 acts on the first thrust bearing 62. Incidentally, since the thrust force that acts on the first thrust bearing 62 in the aforementioned case is relatively small as compared with the case of acceleration, the first thrust bearing 62 practically used is smaller in size than the second thrust bearing 74.

As described above, according to the vehicular power transmission device 10 of this embodiment, the sun gear S and the ring gear R of the central differential gear device 44 are coupled to the first output shaft 46 and the second output shaft 48, respectively, and an end of the first output shaft 46 is supported in the direction of the axis by the third casing 40c via the first thrust bearing 62, and the second output shaft 48 is supported in the direction of the axis by the first casing 40a via the second thrust bearing 74. Therefore, the thrust force of the sun gear S can be supported by the first thrust bearing 62 that supports the first output shaft 46 in the direction of the axis, and the thrust force of the ring gear R can be supported by the second thrust bearing 74 that supports the second output shaft 48 in the direction of the axis. As a result, the thrust bearings needed for individually supporting the sun gear S and the ring gear R can be omitted, and therefore the number of component parts can be reduced and the size of the vehicular power transmission device 10 can be reduced. Besides, the thrust force that occurs in the central differential gear device 44 is supported by the casing 40, and the first and second thrust bearings 62, 74 are always rotating during the driving of the vehicle. This eliminates the need for relatively large rotation-starting torque that is generated in a related art at the time of starting the rotation of the first and second thrust bearings 62, 74, and thus allows stable operation of the differential device.

Furthermore, according to the vehicular power transmission device 10 of the embodiment, the first output shaft 46 is provided with the outer peripheral teeth 70 that have a helix angle, and each of the rotating elements of the central differential gear device 44 is provided with helical teeth. The outer peripheral teeth 70 of the first output shaft 46 and the helical teeth of the sun gear S are provided in such directions that the thrust forces generated by the meshing of the outer peripheral teeth 70 and the meshing of the helical teeth become opposite in direction to each other. Furthermore, the pressing surface 80 that is pressed by the thrust force of the first output shaft 46 and the thrust force of the sun gear S is formed between the first output shaft 46 and the sun gear S. Therefore, the first output shaft 46 and the sun gear S press each other at the pressing surface 80 due to their thrust forces. If the thrust force of the sun gear S is larger than the thrust force of the first output shaft 46, thrust force acts on the casing 40 via the first thrust bearing 62. If the thrust force of the first output shaft 46 is the larger, thrust force acts on the casing 40 via the second thrust bearing 74. It is to be noted herein that if the helix angle βc and the pitch diameter φDcp of the helical teeth provided on the first output shaft 46 and the helix angle βs and the pitch diameter φDsp of the helical teeth of the sun gear S are suitably set, the thrust forces of the first output shaft 46 and the sun gear S can be made substantially equal, and the thrust force that acts on the third casing 40c can be made substantially zero, so that the noise radiation and vibration of the casing 40 caused due to the thrust force working as a compelling force can be reduced. In the related-art vehicular power transmission device, the casing 40 can deform due to thrust force, and can cause an error in the mesh transmission of the outer peripheral teeth 70 provided on the first output shaft 46. However, in the embodiment, since the thrust force that acts on the casing 40 can be made substantially zero and the compelling force that occurs on the outer peripheral teeth 70 can be reduced as mentioned above, the gear noise vibration caused due to the thrust force working as a compelling force can be reduced.

Furthermore, according to the vehicular power transmission device 10 of the embodiment, the first output shaft 46 and the second output shaft 48 are supported in radial directions by the casing 40 via the first to third cylindrical roller bearings (66, 68, 76) so as to be movable in the direction of the axis. Therefore, thrust force can be reliably supported by the first and second thrust bearings (62, 74), and movements of internal component parts in the direction of the axis can be restricted.

Furthermore, according to the vehicular power transmission device 10 of the embodiment, the meshing teeth of each of the sun gear S, the ring gear R and the pinion gears P of the central differential gear device 44 that are meshed with each other have a helix angle. Due to the helix angle, thrust forces are generated on the sun gear S and the ring gear R at the time of driving. Due to the thrust forces, the sun gear S and the ring gear R are pressed against the carrier CA via the pressing portions, so that the differential motion can be restricted so as to reduce the rotation difference among the sun gear S, the ring gear R and the carrier CA.

Furthermore, according to the vehicular power transmission device 10 of the embodiment, if the pitch circle diameters and the helix angles of the outer peripheral teeth 70 of the first output shaft 46 and the meshing teeth of the sun gear S are suitably set, the thrust force loaded on the first thrust bearing 62 can be made small, and therefore the first thrust bearing 62 can be reduced in size.

Furthermore, according to the vehicular power transmission device 10 of the embodiment, since the thrust forces of the sun gear S of the ring gear R of the central differential gear device 44 are supported by the casing 40 via the first thrust bearing 62 and the second thrust bearing 74, the bearings that support the sun gear S and the ring gear R can be omitted. Besides, the first thrust bearing 62 and the second thrust bearing 74 are rotated regardless of whether the central differential gear device 44 is in the differential motion state or in the non-differential motion state. Therefore, the rotation-starting torque for each of the thrust bearings 62, 74 following the start of differential motion is not needed, and the differential limiting torque immediately following the start of differential motion can be stabilized. As the differential limiting torque rise is stabilized, the understeer that is likely to occur when the vehicle starts turning can be restrained. Furthermore, this construction also achieves an effect of stabilizing the differential torque despite changes in the differential speed, and therefore achieves an effect of restraining the vibration caused by fluctuation of the differential torque when the vehicle starts in a turning state.

Furthermore, according to the vehicular power transmission device 10 of the embodiment, since a design is adopted in which the moment load taken into account in the calculation of the service life of the first cylindrical roller bearing 66 is divided to the first thrust bearing 62 and the meshing portion of the sun gear S, the moment load can be set small. Besides, since the moment load is divided to the first cylindrical roller bearing 66 and the shell needle bearing 64 juxtaposed with the first cylindrical roller bearing 66, the moment load can be made considerably small. Therefore, the first cylindrical roller bearing 66 can be reduced in size.

Although the embodiment of the invention has been described with reference to the drawing, the invention is also applicable in other manners.

For example, although in the foregoing embodiment, the first thrust bearing 62 is a thrust bearing that has therein cylindrical rollers, it is also permissible to use a thrust bearing of a different type such as a thrust washer or the like. In that case, it is necessary to adjust the thrust forces of the first output shaft 46 and the sun gear S so that a thrust force within an allowable thrust force range of the substitute thrust bearing acts.

Furthermore, although in the foregoing embodiment, the first output shaft 46 and the sun gear S are set so that their thrust forces offset each other when the vehicle accelerates in the forward travel direction, it is also permissible to set the orientations of the helix angles of the first output shaft 46 and the sun gear S so that their thrust forces offset each other during deceleration of the vehicle. That is, the helix angle can be appropriately set so as to reduce the vibration of the 40 caused by the thrust force during a mode of run of the vehicle that gives rise to a problem.

Furthermore, in the foregoing embodiment, the central differential gear device 44 is a center differential that distributes the drive force unequally to the front wheels and the rear wheels of the vehicle during the non-differential motion state. However, if the central differential gear device 44 is changed to a type of device that distributes the drive force equally to the wheels, the central differential gear device 44 can be applied to a front-wheel differential gear device (front differential) and a rear-wheel differential gear device (rear differential).

Furthermore, in the foregoing embodiment, the first output shaft 46 is supported in radial directions by the shell needle bearing 64. If this support is changed to a support by the casing 40, the amount of moment load assigned to the first cylindrical roller bearing 66 can be made substantially zero.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A vehicular power transmission device comprising:
a casing;
a differential device of a planetary gear type housed in the casing;
an input shaft that transmits power to the differential device; and
a first output shaft and a second output shaft to which the power from the input shaft is output via the differential device; wherein
the differential device includes a carrier, a sun gear, and a ring gear such that the carrier is coupled to the input shaft, the sun gear is coupled to one end of the first output shaft, and the ring gear is coupled to the second output shaft,
the first output shaft and the second output shaft are disposed coaxially in series on an axis with the differential device interposed between the first output shaft and the second output shaft,
an other end of the first output shaft is supported in a direction of the axis by the casing via a first thrust bearing that supports thrust force which is directed toward the other end of the first output shaft,
the second output shaft is supported in the direction of the axis by the casing via a second thrust bearing that supports thrust force which is directed from a first output shaft side toward the second output shaft,
thrust force of the sun gear is supported by the first thrust bearing via the first output shaft, and
thrust force of the ring gear is supported by the second thrust bearing.

2. The vehicular power transmission device according to claim 1, wherein
the first output shaft is provided with outer peripheral teeth that are helical teeth,
each of rotating elements of the differential device, including the carrier, the sun gear, and the ring gear, are provided with meshing teeth that are helical teeth,
the outer peripheral teeth provided on the first output shaft and the helical teeth of the sun gear are provided in such directions that the thrust force generated by meshing of the outer peripheral teeth of the first output shaft and the thrust force generated by meshing of the helical teeth of the sun gear become opposite in direction to each other, and
a pressing surface that is pressed by the thrust force of the first output shaft and by the thrust force of the sun gear is formed between the first output shaft and the sun gear.

3. The vehicular power transmission device according to claim 1, wherein each of the first output shaft and the second output shaft is supported in radial directions by the casing via a cylindrical roller bearing so as to be movable in the direction of the axis.

4. The vehicular power transmission device according to claim 1, wherein
the differential device includes a differential limiting device of a planetary gear type,
meshing teeth of each of the sun gear, the ring gear, and a pinion gear that are in mesh have a helix angle that causes thrust force to be generated,
the pinion gear is rotatably supported by a pinion support hole that is formed in the carrier, and
pressing portions that press each other due to the thrust forces that occur when the vehicular power transmission device is driven are provided between the carrier and the sun gear and between the carrier and the ring gear.

* * * * *